Oct. 9, 1951  F. B. DOWNING ET AL  2,570,435
CATALYTIC VAPOR PHASE FLUORINATION APPARATUS
Filed March 30, 1945
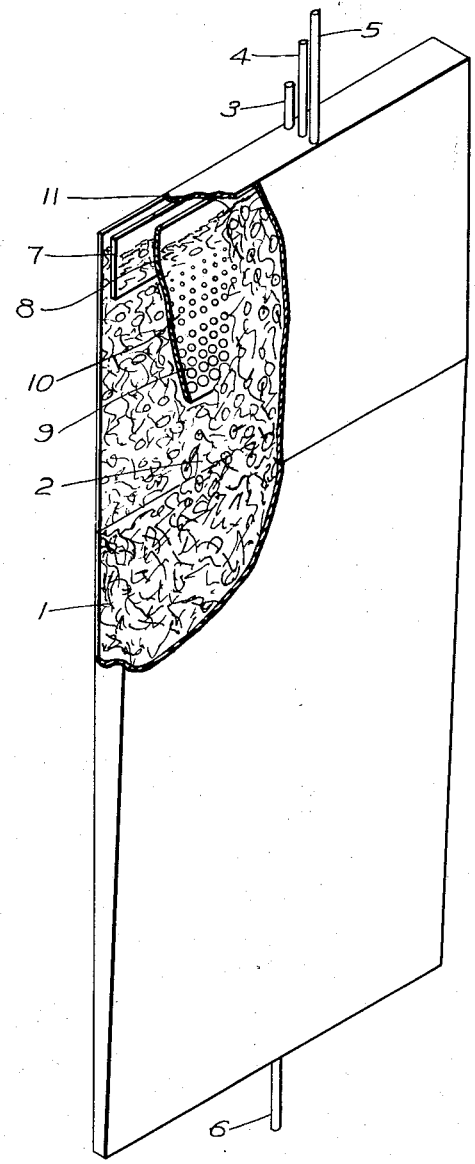
Inventors
Frederick B. Downing
John B. Roberts
By Robert A. Lavender
Attorney Patented Oct. 9, 1951

2,570,435

UNITED STATES PATENT OFFICE 2,570,435

CATALYTIC VAPOR PHASE FLUORINATION APPARATUS

Frederick B. Downing, Carney's Point, N. J., and John B. Roberts, Wilmington, Del., assignors to the United States of America as represented by the United States Atomic Energy Commission Application March 30, 1945, Serial No. 585,763

5 Claims. (Cl. 23—288)

This invention relates to vapor phase reactions and is especially concerned with apparatus for carrying out multi-component vapor phase contact reactions. Such reactions are exemplified by the fluorination of organic compounds by means of elemental fluorine to form fluorocarbons.

In the past it has been proposed to fluorinate organic compounds by elemental fluorine employing catalysts such as silver, cobalt, manganese and cerium fluorides deposited on a suitable catalyst support such as copper, iron, or other heat-conductive metal not too rapidly attacked by the reagents. Elemental fluorine has a decided tendency to attack carbon-to-carbon linkages as well as carbon-to-hydrogen linkages. This tendency results in fluorolysis of a portion of the organic compound to carbon tetrafluoride and hydrogen fluoride. In order to minimize the production of fluorolytic products it is desirable to avoid contact of elemental fluorine with organic compound in the absence of catalytic material. To accomplish this purpose, it has been proposed to introduce the two reagents separately into a catalyst chamber on opposite sides of a barrier extending into the catalyst mass. While the premature admixture of fluorine with organic compound can be avoided in this manner, it has been found that even with the employment of this expedient substantial fluorolysis occurs. The fluorolysis is evidently due, at least in part, to excessive local temperatures which prevail in the reaction chamber in the zone in which fluorine and organic compound are mixed.

It is an object of the present invention to provide an apparatus for carrying out reactions of the type described, in such a manner as to avoid excessive localized temperatures and consequent pyrolytic or fluorolytic reactions. Further objects will appear from the following description of the invention.

In accordance with our invention a contact reaction chamber provided with a gas-permeable contact mass and having inlets for reactants at one end and an outlet for reaction products at the other end is provided with a barrier interposed between the inlets, extending into the contact mass, and having an increasing degree of permeability in the direction of gas flow through the apparatus. The permeable barrier may be a simple perforated plate having more perforations or larger perforations toward the lower pressure areas to secure progressively greater permeability in the direction of gas flow. This greater permeability also can be secured by reducing the thickness of the perforated plate. Instead of a solid unitary plate, a laminated barrier of two or more screens each longer than the next may be used. Or the barrier element may comprise a bed of fine particles of an inert substance confined by suitable means such as screens. The desired change in resistance of gas flow through such a bed may be obtained by varying the thickness of the bed or by varying the volume of interstitial space between the particles by varying the size and/or shape of the particles composing the bed. Other methods of securing permeability will be evident from these illustrations.

By employing an apparatus constructed in accordance with the teachings of the invention, it has been found that the mixing of reactants can be effected sufficiently gradually to distribute the heat of reaction over any desired reaction zone and thus prevent excessive temperature rise at any particular locality.

The invention may be used in combination with other expedients for improving heat distribution. Thus, it may be applied to a fluorination in which an inert gas screen is employed to shield the reactants and provide a high degree of dilution at the point of first contact. Similarly, the invention may be employed in conjunction with catalyst masses of graduated activity of the type described and claimed in U. S. patent application Serial No. 552,182 of Anthony F. Benning, filed August 31, 1944, and entitled "Vapor Phase Fluorination and Apparatus Therefor," now Patent No. 2,505,877.

In the accompanying drawing a perspective view of one form of apparatus within the purview of the invention has been shown with a portion cut away for purposes of illustration. This apparatus comprises a vertically disposed reaction chamber in two segments. The lower segment 1 is tapered to provide a very narrow cross-section at the bottom. The upper section 2 is of substantially uniform cross-section. The reaction chamber is provided with inlet 3 for organic compound, inlet 4 for nitrogen, and inlet 5 for fluorine at the top, and outlet 6 for reaction products at the bottom. The chamber is shown with segment 1 filled with finely divided catalytic material, such as silver fluoride supported on copper turnings, and with segment 2 nearly filled with a body of somewhat coarser catalytic material, such as silver fluoride disposed on a catalyst support comprising a mixture of #1½ copper tacks and a minor proportion of copper turnings. Extending down from the top of the reaction chamber between inlets 3 and 4 is a solid baffle 7. Extending downward between inlets 4 and 5 is a perforated baffle 8 provided with large perforations 9 near the bottom and smaller perforations 10 thereabove. A baffle comprising five rows of half-inch holes 9 and five rows of an equal number of quarter-inch holes 10 has performed very satisfactorily. A more gradual increase in permeability may be secured by providing slightly larger holes in each row from top to bottom. The top 11 of the catalyst mass forms with the barriers and the sides and top of the chamber, three channels or tuyères for the gases and extends sufficiently above the bottom of barrier 7 and above the topmost perforations in barrier 8 to provide a substantial pressure drop between the channels. The extension of the catalyst mass in this way serves the purposes of providing enough pressure drop in the mass above the bottom of barrier 7 to allow efficient distribution of the gases entering the mass and of preventing small fluctuations in pressure from causing flow of gases from one channel to another and of conducting away from the immediate reaction zone, the intense heat of reaction resulting from first contact of the organic compound and fluorine in the catalyst mass. Since the purposes can be effected by any inert thermally conductive material, the mass need not be catalytic in the regions between the barriers.

It is obvious the apparatus described above may be modified. For example, if the reactants have a sufficiently low heat of reaction that it is feasible to omit the use of buffering inert gas streams, the reactor may be constructed with inlet 4 and baffle 7 omitted.

The particular shape of the reactor as illustrated is desirable when the reaction to be carried out generates a considerable amount of heat. The narrow width allows the heat to rapidly traverse the reactor to the walls from whence it can be extracted by suitable means such as a current of coolant media in which the reactor is immersed. If the heat of the reaction is of a lesser degree, the reactor can be of a shape that its cross-section is more nearly square or even circular.

The entire apparatus should be provided with means (not shown) for heating to start the operation and for cooling (not shown) to maintain desired operating temperatures should heating or cooling be necessary. Any suitable material such as copper or iron may be used for its construction.

The apparatus illustrated may be operated for the production of fluorinated products by reaction of organic compounds and elemental fluorine in the following manner:

A mixture of lubricant oil vapor and nitrogen preheated to a temperature of about 300° C. and comprising about 6 cu. ft. of nitrogen (NTP) for each 50 cubic centimeters of liquid oil is introduced at 3 and a mixture of an equal volume of nitrogen with about 400 grams of fluorine for each 6 cubic feet of nitrogen is introduced at 5, while an equal volume of nitrogen free of organic compound and fluorine is introduced at 4. The temperature of the reactor is maintained between 150° C. and 400° C., preferably at about 300° C. Reaction products are withdrawn through outlet 6 and passed to a suitable condensing system (not shown) to recover the fluorinated lubricant oil and by-products, such as hydrogen fluoride and incompletely fluorinated compounds. The fluorinated oil may be separated from hydrogen fluoride by fractional condensation or distillation or by washing with aqueous alkaline solution.

It is sometimes advantageous to subject the fluorination product to a further fluorination treatment to replace by fluorine final small proportions of hydrogen. This may be accomplished by recycling the product or by passing it through a second reactor which may be a simple catalyst chamber provided with a single zone of finely distributed catalyst. Since the reactivity of fluorine with fluorinated compounds containing only a very small proportion of the original hydrogen is substantially less violent than with organic compounds such as hydrocarbons used as starting materials, the pervious barrier distribution system may be omitted from this second catalyst chamber.

In preparing the catalyst chamber for operation, the copper may be plated with silver by a conventional plating process, and the plated copper may then be treated to form a coating of silver difluoride by passing fluorine diluted with nitrogen through the apparatus for several hours at about 290° C.

After the apparatus has been used for a considerable period, the catalyst activity becomes impaired. In order to restore the catalyst to its original effectiveness, the following procedure may be used.

Fluorine diluted with nitrogen is passed through the reactor at about 300° C. until a strong fluorine test on potassium iodide paper is obtained at the outlet. Passage of the fluorine is continued for another hour. This treatment removes any hydrocarbon material in the catalyst mass. The reactor is then cooled below 100° C. and filled with water. After 30 minutes, the water is drained out, and the reactor is washed with aqueous 0.5% NaOH solution until the wash water is no longer acid to Congo Red indicator paper.

The reactor is then drained of wash water and filled with an aqueous solution containing about 6% NaCN, about 0.04% NaOH, and about 9% AgNO$_3$. After the plating solution has remained in the reactor for 4 hours, it is drained off and the reactor is washed several times with water.

After the final washing, the reactor is heated to about 300° C. while filled with nitrogen and the silver-plated catalyst mass is then activated by passing a mixture of nitrogen and fluorine through in the manner previously described.

It will be understood that we intend to include variations and modifications of the invention and that the preceding examples are illustrations only, and in no wise to be construed as limitations upon the invention, the scope of which is defined in the appended claims, wherein we claim:

1. A reactor for multi-component vapor phase contact reactions, which comprises a reaction chamber adapted to contain a permeable body of contact elements, a pair of reagent inlets at one end, an outlet for reaction products at the other end, and a barrier between said pair of inlets, said barrier extending into said reaction chamber for a substantial distance and having increasing permeability to gases in the direction of gas flow through the chamber.

2. A reactor for multi-component vapor phase contact reactions, which comprises a reaction chamber adapted to contain a permeable body of contact elements, a pair of reagent inlets at one end, an outlet for reaction products at the other end, and a barrier plate between said pair of inlets, said plate extending into said reaction chamber for a substantial distance and having perforations of progressively larger size in the direction of gas flow through the chamber.

3. A reactor for multi-component vapor phase contact reactions which comprises a reaction chamber adapted to contain a permeable body of contact elements, a pair of reagent inlets at one end of said chamber, an inlet for inert gas between said pair of inlets, an outlet for reaction products at the other end of said chamber, a gas impervious first barrier between one of said reagent inlets and said inert gas inlet extending into said reactor for a short distance, a second barrier between the other of said reagent inlets and said inert gas inlet, said second barrier extending into the reactor for a substantial distance and being impervious to gas along that portion adjacent said first barrier and having increasing permeability to gases along the remainder of its length in the direction of gas flow through the chamber.

4. A reactor for multi-component vapor phase contact reactions which comprises a reaction chamber adapted to contain a permeable body of contact elements, a pair of reagent inlets at one end of said chamber, an inlet for inert gas between said pair of inlets, an outlet for reaction products at the other end of said chamber, a gas impervious first barrier between one of said reagent inlets and said inert gas inlet extending into said reactor for a short distance, a second barrier between the other of said reagent inlets and said inert gas inlet, said second barrier extending into the reactor for a substantial distance and having a perforated portion along that portion extending into the reactor further than said first barrier, said perforated portion having progressively larger perforations in the direction of gas flow through the chamber.

5. A reactor for multi-component vapor phase contact reactions which comprises a tall vertically disposed container having a substantially rectangular cross-section which is enclosed by two wide sides, two narrow sides, a top and a bottom, an inlet for one gaseous reactant in said top near to one of said wide sides, an inlet for a second gaseous reactant in said top near to the other of said wide sides, an inlet for an inert gas situated in said top between said inlets for gaseous reactants, an imperforate barrier depending from said top between said inlet for one gaseous reactant and said inlet for an inert gas and extending parallel to said wide sides from one narrow side to the other narrow side, said barrier terminating shortly below the top of the container, another barrier depending from said top between said inlet for said second gaseous reactant and said inlet for an inert gas and extending parallel to said wide sides from one narrow side to the other narrow side, said other barrier being imperforate in its upper portion opposite said first barrier and having a lower perforate portion having progressively larger perforations in the downward direction, the lower section of the reactor being tapered to provide a very narrow cross-section at the bottom, and an outlet for gaseous reaction products located in said bottom, said reactor being adapted to hold catalyst for promoting the reaction.

FREDERICK B. DOWNING.
JOHN B. ROBERTS.

No references cited.